DATA SELECTING AND SYNCHRONIZING CIRCUIT COMPRISING PLURAL GATES AND FLIP-FLOPS INTERCONNECTING DATA HANDLING SYSTEMS

Filed Aug. 26, 1959 3 Sheets-Sheet 1

INVENTORS
DOUGLAS R. MAURE
BENJAMIN M. NAUSS

BY

ATTORNEYS

INVENTORS
DOUGLAS R. MAURE
BENJAMIN M. NAUSS
BY
ATTORNEYS

Nov. 12, 1963 D. R. MAURE ETAL 3,110,866

DATA SELECTING AND SYNCHRONIZING CIRCUIT COMPRISING PLURAL GATES AND FLIP-FLOPS INTERCONNECTING DATA HANDLING SYSTEMS

Filed Aug. 26, 1959 3 Sheets-Sheet 3

INVENTORS
DOUGLAS R. MAURE
BENJAMIN M. NAUSS

BY Paul W. [signature]

ATTORNEYS

United States Patent Office 3,110,866
Patented Nov. 12, 1963

3,110,866

DATA SELECTING AND SYNCHRONIZING CIRCUIT COMPRISING PLURAL GATES AND FLIP-FLOPS INTERCONNECTING DATA HANDLING SYSTEMS

Douglas R. Maure, San Marino, and Benjamin M. Nauss, Canoga Park, Calif., assignors, by mesne assignments, to the United States of America as represented by the Secretary of the Navy Filed Aug. 26, 1959, Ser. No. 836,314
4 Claims. (Cl. 328—110)

This invention relates generally to data processing systems and in particular to a circuit for selecting and synchronizing a unique signal from serial information containing a series of signals.

As information theory techniques improve, the necessity of devising ways and means of conveying data from one information handling system to another in such manner as to be properly correlated and interpreted for useful purposes has become of paramount importance in the data processing field. Accordingly, this invention is concerned with the separation of desired intelligence signals or bits of certain types such as binary numbers or words from a group of similar intelligence or other signals or both, as the case may be and, at the same time, impart synchronization of said desired intelligence signals between data transmitting computer equipment and data receiving, resolving or recording computer equipment during certain given operational conditions. In the instant invention, a number of predetermined signals are employed as known input signals which act as operators for actuating the various and sundry elements which are concomitantly receiving, selecting, sorting, handling, coordinating, and synchronizing the aforesaid desired information signals from the composite input serial information received from said data transmitter. Such input signals could, for example, be obtained from Sonar and associated data group systems and be of the nature of range, bearing, or timing intelligence or the like, and when they are properly manipulated by the components of the subject circuit, the accurate and synchronized transmission of information from one ship to another or one place to another is facilitated. Hence, it can readily be seen that if the data is required on each ship, one acts as a transmitter and the other a receiver. For the purpose of avoiding errors due to such disturbances as noise, phase shift, and amplitude variation or in order to allow transmission of a plurality of groups of data over a single channel, the transmitter information is encoded. The receiver then decodes after proper selection and synchronization of the desired data signals from said groups by the subject circuit.

Therefore, an important object of this invention is to provide an electronic link between two data processing systems which selects desired intelligence from a series of information being handled by one such system and passes it on to the other in such manner that said intelligence is synchronously processed thereby.

Another important object of this invention is to provide controlled selection of desired synchronized data signals from a plurality of signal groups.

Another object of this invention is to select signals representative of binary coded numbers or words which are ordered serially from a plurality of data sources.

Another object of this invention is to provide a new and useful system for sorting data.

A further object of this invention is to provide a system for extracting arranged binary coded information from arranged binary or other coded serial information.

A still further object of this invention is to provide a system employing phase and amplitude detection principles for selection of one unique pulse from a series of signals.

Another object of this invention is to transmit a maximum amount of information over a given band width and still permit selection of unique data signals from a code with a minimum use of available time.

Another object is to provide a coded data selection and synchronization circuit which is substantially independent of the rate at which the data is received thereby.

Other objects and advantages of the invention will hereinafter become more fully apparent from the following description of the annexed drawings wherein.

Figure 1:
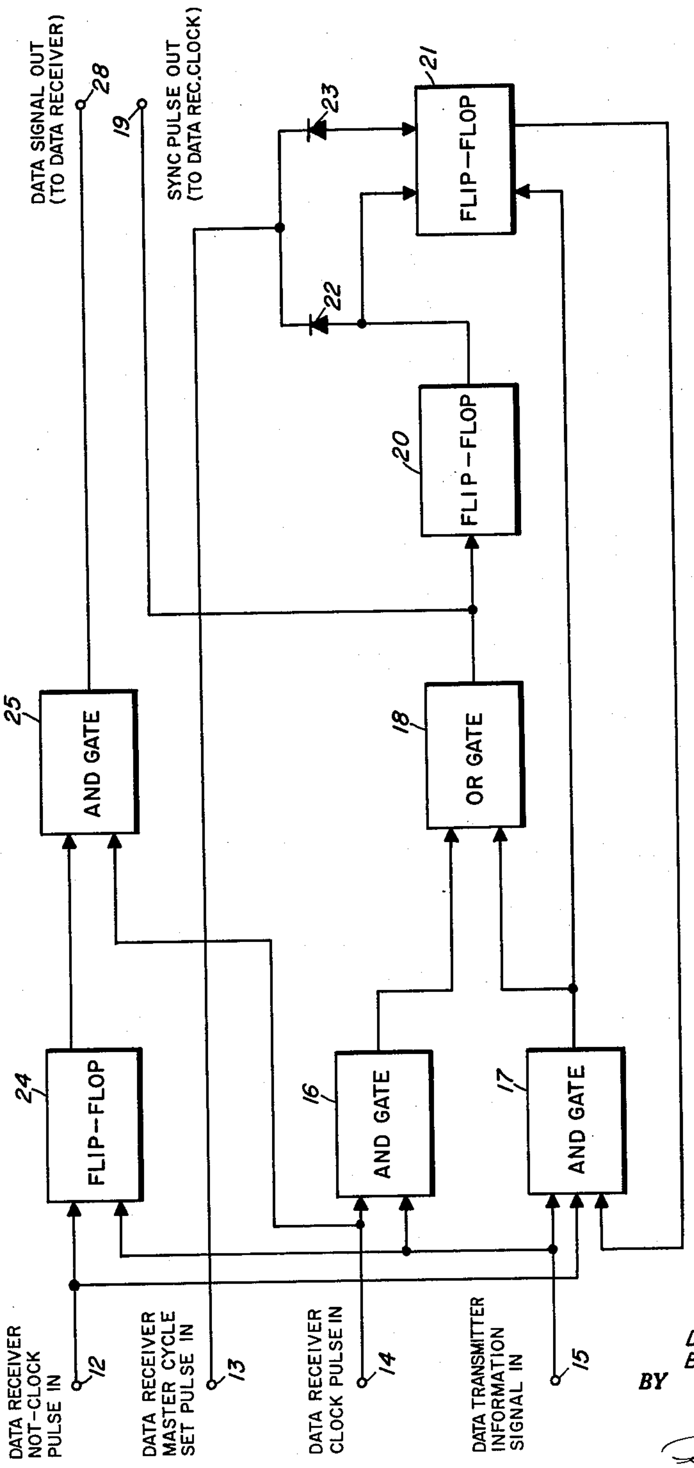
FIG. 1 is a schematic diagram of an embodiment of the synchronizer and data selector constructed in accordance with the invention.
Figure 2:
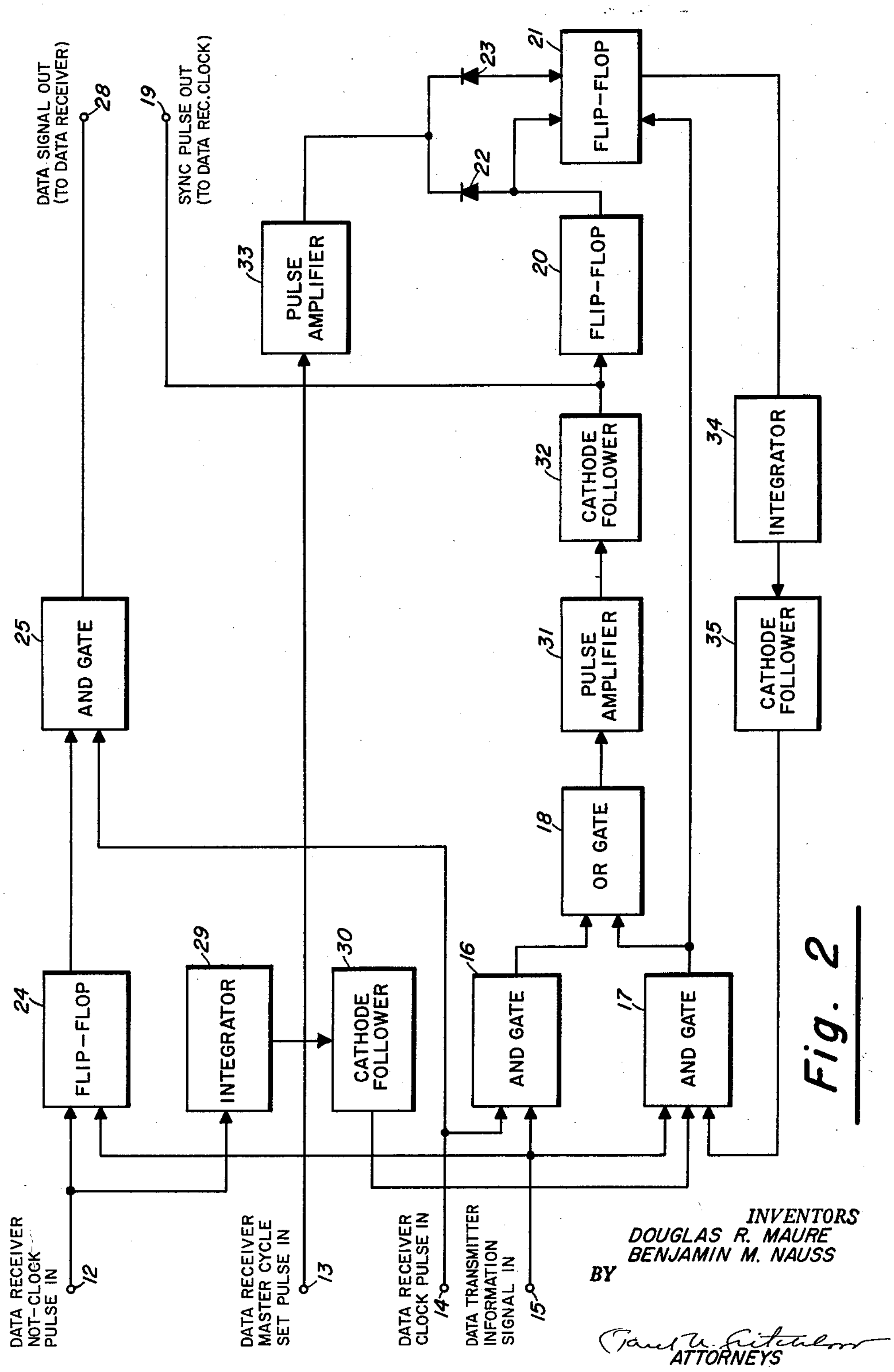
FIG. 2 is a schematic diagram of a refined waveshape embodiment of the synchronizer and data selector constructed in accordance with the invention.

Referring now to FIGS. 1 and 2 of the drawings, a plurality of various and sundry input signals or pulses are fed into the system circuit constituting this invention. These pulses may be obtained from any appropriate computing equipment capable of producing same in a manner such that they represent pertinent usable factors or parameters. For example, Sonar and associated computing equipment would be capable of producing these signals, but it is to be understood that use of the subject invention is not intended to be limited to being used in conjunction with Sonar equipment alone, inasmuch as many other types of data handling and processing apparatus would also be appropriate and could be used therewith to an advantage.

One of such signals is a data receiver not-clock pulse and is applied to an input binding post 12 or other electrical connector of conventional type. The not-clock pulse may be defined as a square waveform or timing trigger pulse which may be either symmetrical or unsymmetrical as necessary to perform a predetermined timing function for the purpose of controlling the time of an interrogation sequence. Another of such signals is a data receiver clock pulse whose waveform is similar to the above mentioned not-clock pulse but is 180° out of phase therewith. It, likewise, is used for the purpose of controlling a predetermined timing function such as the time of an interrogation sequence. Each of the foregoing signals is supplied by the aforementioned data receiver or associated apparatus which does not constitute a part of this invention but, nevertheless, they must be provided as input signals in order to effectively actuate the circuit of the subject invention.

In addition, another known but perhaps variable signal is supplied as a collateral signal to this circuit. It is obtained from the data processing system constituting the data receiver and represents a master timing parameter which is to be synchronized with similar parameters of the data processing system constituting the data transmitter. For instance, such signal may be a basic timing signal of such nature as to actuate a ring generator for providing a plurality of rings or pulses which, in turn, represent factors necessary for proper and timely data processing for synchronization purposes.

The signals containing the unique intelligence or data signals or bits such as binary words or numbers combined with a sequentially associated sync pulse are herein called the information-in signals. From these signals, said unique intelligence or data signal is selected and appropriately arranged with respect to said collateral signals and said sync signal to facilitate their further use in the data receiver and associated equipment adapted to be responsive thereto in order to perform any given function of analog or digital nature or otherwise.

The aforesaid data receiver master cycle set pulse, the data receiver clock pulse and the information signals are fed into the circuit of this invention through conventional electrical connectors such as binding posts 13, 14, and 15, respectively.

The information-in containing the data signals to be selected and synchronized is simultaneously applied to a first AND gate 16 and a normally closed second AND gate 17. These AND gates are merely gating circuits with two or more inputs. They are conventional and often referred to as coincidence circuits because an output occurs only when all input signals coincide. The outputs from AND gates 16 and 17 are applied to an OR gate 18. OR gates are, likewise, conventional and receive signals at two or more inputs and, when appropriately selected, they will pass signals presented at either input. Essentially, they are mixers with the exception that the output amplitude is not doubled should the two separate input pulses coincide, and, in addition, they provide isolation between the circuits feeding them.

The output of OR gate 18 is connected to a sync pulse out terminal 19, and during normal operating conditions it contains the sync pulse which is coupled to the clock or other timing means in the data receiver to provide a zero time reference datum such as the aforesaid data receiver master cycle set pulse. The output of OR gate 18 is also coupled to a flip-flop 20 which may be of the binary counter type where the input signals are common to both grids and the output is taken from only one of the plates thereof. Said output is connected to the portion of a linear flip-flop 21 which has been preset to be conductive during an initial, starting, or quasi-starting condition by the aforesaid master cycle set pulse from the data receiver. Since flip-flop 21 has two separate input grids, an input to one of the grids, such as, for example, the grid of the aforementioned conductive portion, will cause it to assume one of its two stable states and repeated input pulses to this same grid will have no further effect, although a pulse on the other input grid will cause the flip-flop to change over to the other stable condition of operation. The output of AND gate 17 is coupled to that portion of flip-flop 21 which is initially set to be non-conductive for timely changing same to said other stable condition. In addition, the initially set non-conductive portion of flip-flop 21 has its output fed back as an input to AND gate 17 for the purpose of blocking a signal from going therethrough in event flip-flop 21 is in the wrong stable condition. Flip-flop 21 also has its initially set conductive portion connected to receive the data receiver master cycle set pulse in through a pair of circuit isolation diodes 22 and 23 with diode 22 connected to flip-flop 20 as well. If, in some instances, it becomes desirable to coordinate said master cycle set pulse with some other parameter from other or associated equipment, this may be accomplished by using an auxiliary AND gate which is responsive to said set pulse and said parameter signal as an intermediate input stage to the aforementioned diodes and flip-flops. Likewise, it is within the purview of this invention to include a master cycle set pulse excited ring generator either separately or in conjunction with said auxiliary AND gate as an impetus for flip-flop 21, although such components are not employed in the subject preferred embodiment.

As well as being applied to AND gates 16 and 17, the information-in signals are simultaneously applied to a flip-flop 24 at its momentary original conducting portion along with the aforementioned not-clock pulse from the data receiver which is also applied thereto at the original non-conducting portion. The output from flip-flop 24 is coupled to an AND gate 25 along with the aforesaid clock pulse from the data receiver for timely actuating said AND gate 25 to effect proper sequential arrangement of the information-out, including the selected intelligence and data signals or bits with respect thereto, and to effect appropriate arrangement with respect to the sync output signal as well as at an output terminal 28.

Briefly, the operation of the circuit system constituting this invention is as follows. It has been found, for example, that a waveform using a single sinewave cycle to represent one bit or pulse of intelligence works well as the information-in signal. Thus, if there is a bit in every slot, the waveform is almost a continuous sinewave. And if a minimum number of bits exist, there may only be three single sinewave cycles in a major cycle, although it will be readily recognized that there are a large number of possible combinations available. This sinewave is gated into the subject system after a half cycle of the information rate has elapsed which, in turn, produces an out-of-phase sinewave that is the unique pulse detected in the synchronization circuit.

The invention system operates on the premise that the information-in consists of at least two data pulses and only one sync pulse in any major cycle with the sync pulse displaced in time or out of phase with the data pulses. When operating normally, the information-in is in the form of narrow pulses which coincide in time with the center of the data receiver not-clock pulse, and the data receiver processing system is synchronized with the received data. Flip-flop 24 converts the narrow information pulses into wide pulses by turning itself "on" with each bit of information and turning itself "off" with the not-clock pulses. Flip-flop 24 and the clock pulses open AND gate 25 and produce a standard width pulse for each bit of information. In event there is no input data and the data receiver clock is free-running, sync flip-flops 20 and 21 will be in reset position with the output portion of flip-flop 21 in a non-conductive state. But, in event that information signals are being received and that they are in phase with the clock pulse, then the sync pulse will be in phase with the not-clock pulse and only information pulses will be allowed to enter through AND gate 16, since AND gate 17 is normally "off" and is controlled by the state of flip-flop 21 and the feedback therefrom.

The first bit of information which enters through AND gate 16 will reset the data receiver clock so that the sync flip-flops will not be reset until the predetermined master cycle set pulse has been received thereby through the isolation diodes. If the first bit of information is not exactly in the center of the clock pulse, the first reset of the clock will synchronize the succeeding information pulses with the center of the clock pulse, and, likewise, the sync pulse will coincide with the center of the not-clock pulse.

The second bit of information enters through AND gate 16 and again resets the clock in the same manner as before so that the sync flip-flops will not be set for "*n*" pulses after reset. The second bit of information changes the state of flip-flop 20 which, in turn, changes the state of flip-flop 21 and opens AND gate 17. Now both AND gates 16 and 17 are open, allowing information to still reset the clock and change the state of flip-flop 20 but will not change the state of flip-flop 21. Because AND gate 17 is open, the sync pulse enters, resets the data receiver clock, changes the state of flip-flop 20, and resets flip-flop 21. When both the receiver clock and flip-flop 21 are reset, flip-flop 21 closes AND gate 17. Then the sync pulse is in phase with the clock pulse and the bits are in phase with not-clock pulse and, therefore, information bits can no longer reset the data receiver clock. Before the next sync pulse arrives some predetermined number of pulses away, the sync flip-flops are reset, and thereafter only flip-flop 20 will change its state during normal operation. Thus, it can be seen that the selected unique signals or bits constituting the information-out are properly associated with the sync output signal from a time-phase aspect and sent to the data receiver equipment in such a synchronized arrangement.

Referring now to FIG. 2, it will be noted that the circuit embodiment depicted therein is basically similar to the embodiment of FIG. 1 with the exception that a few optimizing components enabling the modification and refinement of the various and sundry intermediate signal waveshapes have been included to produce improved operation of their respective individually actuated system elements by characterizing said waveshapes in such manner as to better conform with the natural inherent requirements thereof for more efficient operation. The elements which are common to the embodiments of both figures have been given the same reference numbers for the purpose of simplicity of description. Hence, the explanation of the basic major elements of the subject embodiment is comparable to that presented to explain the structural elements of the device of FIG. 1 and their interconnection, and should be referred to for each purpose.

One of the added features of the embodiment of FIG. 2 consists of including a series connected integrator 29 and cathode follower 30 between not-clock pulse input terminal and an input to AND gate 17. Since high frequency harmonic components of waveforms are diminished through integrator networks, said integrator 29 effects filter refinement of said not-clock pulse as it travels therethrough enroute to said AND gate 17. Cathode follower 30 is used in conjunction therewith for circuit isolation purposes.

Another of the added features of the subject embodiment include incorporation of a pulse amplifier 31 to increase the strength of the output of OR gate 18 and a cathode follower 32 to isolate gates 16, 17, and 18 and pulse amplifier 31 from sync flip-flops 20 and 21.

A pulse amplifier 33 is used between the master cycle set pulse in and isolation diodes 24 and 25 for increased sensitivity purposes. Included in the feedback circuit between the output of flip-flop 21 and input of AND gate 17 are series connected integrator 34 and cathode follower 35 which are used as a signal filter and a circuit isolator, respectively.

The operation of the embodiment of FIG. 2 is substantially comparable to that of the embodiment of FIG. 1 with the possible exception that the former may be somewhat more efficient than the latter due to the intermediate signal refinement just mentioned.

The new method and means of signal transmission constituting this invention as it is disclosed in either of the above preferred embodiments may, for example, use opposite phases of a sine wave to distinguish between a "one" and a "zero." When transferring from a "one" to a "zero" or from a "zero" to a "one," a space is made equal to half the time of a single sine wave. This space, of course, is necessary to prevent a discontinuity and unbalance of the waveform, and it occurs only during the clock time, which, in turn, leaves a space during not-clock time as a unique condition for the synchronizing pulse.

Figure 3:
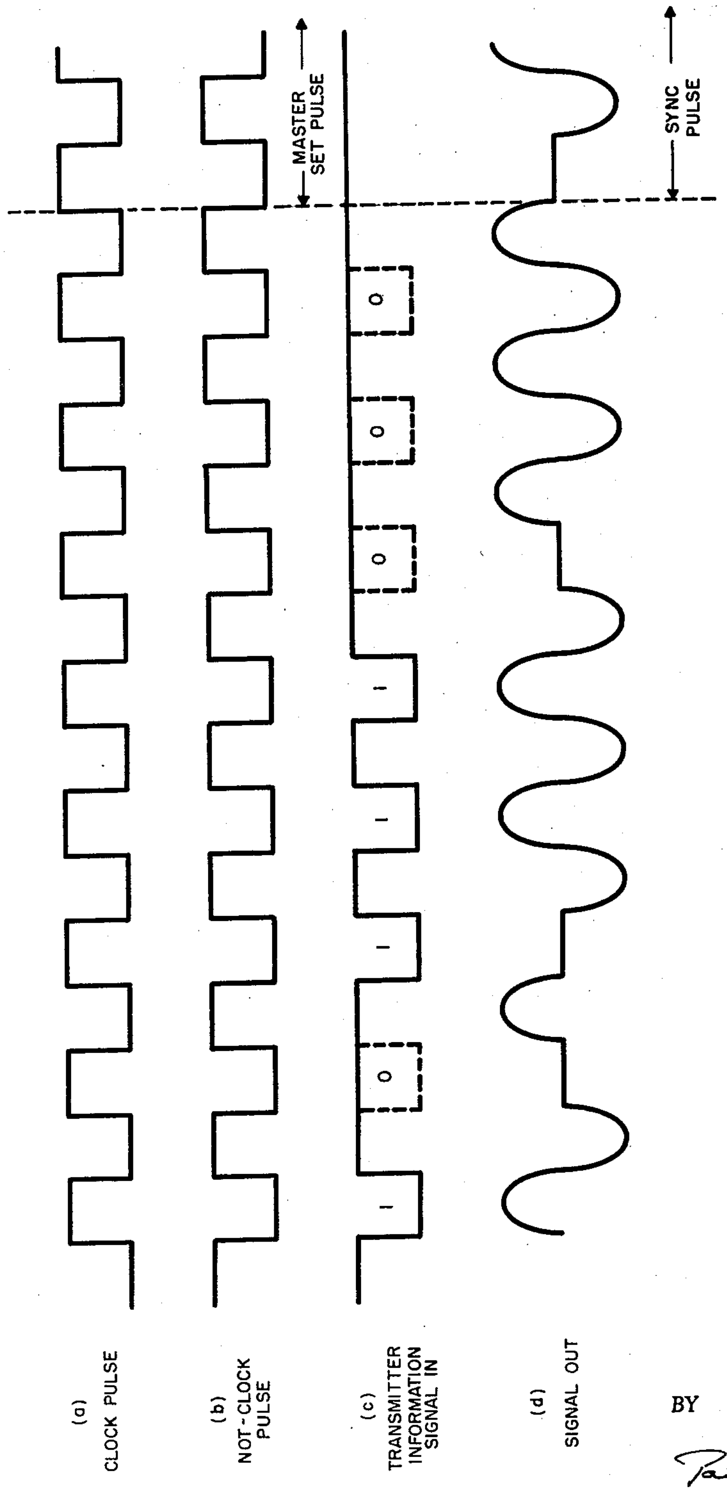
FIG. 3 is a graphical representation of exemplary waveforms which may be employed as input signals to the subject invention along with typical representations of the output waveforms that may occur as a result of using said input waveforms.

FIG. 3 shows the waveforms of the various data configurations. FIG. 3(*a*) discloses exemplary clock pulses while FIG. 3(*b*) shows the not-clock pulses. FIG. 3(*c*) illustrates the converted data in a form which is available for being transmitted by a radio link or any other suitable data processing system. It should be noted that a space occurs during the clock pulse time only, when there is a change from a "one" to a "zero" or vice versa.

Recovering the data after transmission is very simple by looking at the data waveforms only during the not-clock time. Notice, for instance, in FIG. 3(*c*) that there is a negative portion of a sine wave during the not-clock time for every "one" condition of the data and a positive portion of a sine wave during the not-clock time for every "zero" condition.

By using this method of transmission the signal to noise ratio is for most practical purposes considerably improved and perhaps as much as doubled that of the prior art because a "one" pulse is the peak negative state and a "zero" pulse is the peak positive state.

As stated previously, the master pulse occurs as a space during the not-clock time and this is a unique condition since there are no other spaces during the not-clock time. FIG. 3(*c*) shows the sync pulse during the last two clock times. Two clock times are used for thesync pulse, of course, in order to keep the total space time equal to one "clock" and "not-clock" period.

It can, therefore, be readily seen that if exemplary signals having the respective waveforms of FIG. 3 are applied to the subject invention the waveform shown as FIG. 3(*d*) may result as the output signal therefrom which is ready to be transmitted to any other remote second data processing system for further use thereby. As can be seen from said output signal, the input signals have been respectively phase related, arranged, and properly correlated by the device constituting this invention to effect the desired exemplary output signal emanating therefrom as shown in the FIG. 3(*d*) representation.

Obviously, many other modifications and variations of the present invention are possible in the light of the above teachings. It is therefore, to be understood that within the scope of the appended claims the invention may be practiced otherwise than as specifically described.

What is claimed is:

1. A data selecting and synchronizing circuit comprising in combination, a first AND gate having a trio of inputs and an output, a second AND gate having a pair of inputs and an output, a third AND gate having a pair of inputs and an output, an OR gate having a pair of inputs and an output, a first flip-flop having a pair of inputs and an output, a second flip-flop having an input and an output, a third flip-flop having a trio of inputs and an output, said first and second AND gates and said first flip-flop having one of their inputs interconnected to receive an information signal, said first AND gate and said first flip-flop having another of their inputs interconnected to receive a first predetermined timing signal, said second AND gate and said third AND gate having one of their inputs interconnected to receive a second predetermined timing pulse, the other input of said third AND gate being coupled to the output of said first flip-flop, said pair of OR gate inputs respectively connected to the outputs of said first and second AND gates, and said OR gate output connected to the input of said second flip-flop to provide a sync pulse signal output, one of the inputs of said third flip-flop connected to the output of said second flip-flop, another of the inputs of said third flip-flop coupled to the output of said first AND gate, a pair of diodes having the inputs thereof interconnected to recenve a master sync signal, the outputs of said diodes respectively connected to said one input and the remaining input of theaforesaid third flip-flop, the output of said third flip-flop connected to the remaining input of said first AND gate, and the output of said third AND gate providing a predetermined data signal output.

2. A data selecting and synchronizing circuit comprising in combination, a first AND gate having a trio of inputs and an output, a second AND gate having a pair of inputs and an output, a third AND gate having a pair of inputs and an output, an OR gate having a pair of inputs and an output, a first flip-flop having a pair of inputs and an output, a second flip-flop having an input and an output, a third flip-flop having a trio of inputs and an output, said first and second AND gates and said first flip-flop having one of their inputs interconnected for receiving a predetermined information signal, a first integrator having an input and an output, a first cathode follower interconnecting the output of said first integrator and another of the inputs of the aforesaid first AND gate, the input of said first integrator connected to said one input of said first flip-flop for receiving a first predetermined timing signal, said second AND gate and said third AND gate having one of their inputs interconnected for receiving a second predetermined timing pulse, the other input of said third AND gate being coupled to the output of said first flip-flop, said pair of OR gate inputs respectively connected to the outputs of said first and second AND gates, a pulse amplifier connected to the output of said OR gate, a second cathode follower connected to the output of said pulse amplifier, the output of said second cathode follower being connected to the input of said second flip-flop to provide a sync pulse signal output in addition, one of the inputs of said third flip-flop connected to the output of said second flip-flop, another of the inputs of said third flip-flop coupled to the output of said first AND gate, a pair of diodes having their inputs interconnected and their outputs respectively connected to said one input and the remaining input of the aforesaid third flip-flop, a pulse amplifier for receiving a master sync signal having its output coupled to the interconnection of the inputs of said diode, a second integrator connected to the output of said third flip-flop, a third cathode follower interconnecting the output of said second integrator and the remaining input of said first AND gate, and the output of said third AND gate providing said predetermined data signal at the output thereof.

3. A synchronizer and data selector system comprising in combination, first conductor means for receiving serial information containing a unique code signal and a sync pulse from a first data processing system, a second and third conductor means for respectively receiving a pair of predetermined signals from a second data processing system, means interconnecting said first, second, and third conductor means for respectively and relatively positioning said sync pulse and said predetermined signals within a unitary continuous signal including a first AND gate for receiving said sync pulse and one of the aforesaid pair of predetermined signals, a second AND gate for receiving said sync pulse, the other of said pair of predetermined signals, and a timing signal, an OR gate connected to the outputs of said first and second AND gates, a binary counter flip-flop connected to receive the output of said OR gate, and a linear flip-flop coupled to the output of said binary counter flip-flop and to said second AND gate for feeding said timing signal thereto, means connected to said positioning means for selectively phase relating said unique code signal with the aforesaid relatively positioned sync pulse and a pair of predetermined signals within said unitary continuous signal, and fourth conductor means responsive to said last mentioned phase relating means for supplying the output therefrom to said second data processing signal.

4. A synchronizer circuit for passing a unique code signal between two data processing systems comprising in combination, means for receiving serial information containing a unique code signal from one of said data processing systems, means for receiving a pair of predetermined timing signals from the other of said data processing systems, means connected to said serial information receiving means for selecting and separating said unique code signal from said serial information including a bistable multivibrator, said multivibrator having a first half responsive only to said pair of predetermined timing signals for sequentially changing the state thereof, said multivibrator having an output proportional to and representative of said unique code signal when said first half is in a conductive state, and gate means connected to said multivibrator responsive to both said unique code signal and the other of said pair of predetermined timing signals for passing said unique code signal when said unique code signal and the other of said pair of predetermined timing signals are simultaneously received thereby, means interconnecting said serial information receiving means and said selecting and separating means for positioning said unique code signal with said pair of predetermined timing signals in a predetermined relative phase relationship, and means coupled to said positioning means for conveying said phase related unique code signal to the aforesaid other data processing system.

No references cited.